Jan. 8, 1963  R. E. FULLER  3,072,361
TENSION CONTROLLING DEVICE
Filed Sept. 5, 1961  2 Sheets-Sheet 2
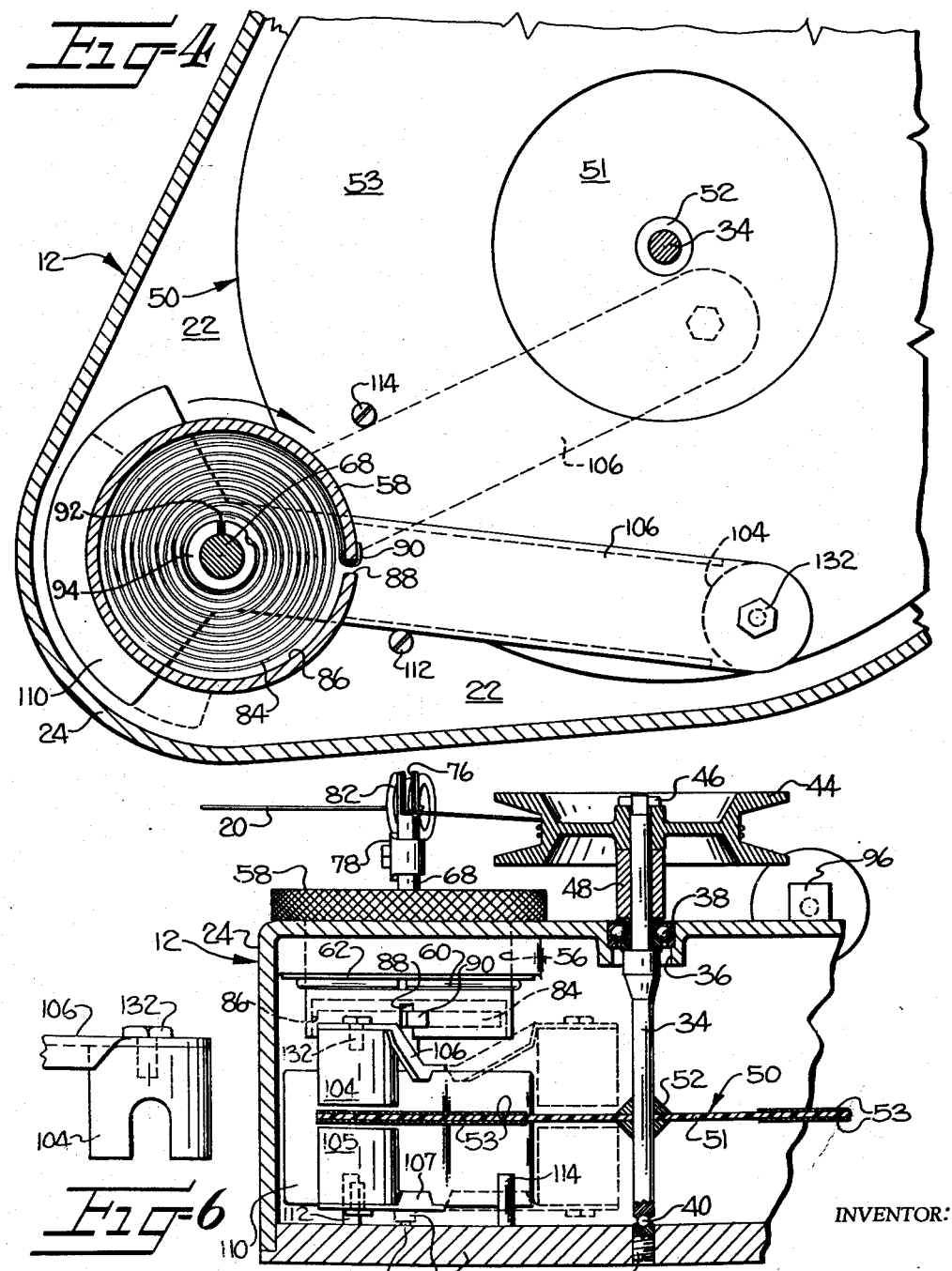
INVENTOR:
RICHARD E. FULLER
BY Eaton, Bell, Hunt & Seltzer
ATTORNEYS ered # United States Patent Office 3,072,361
Patented Jan. 8, 1963

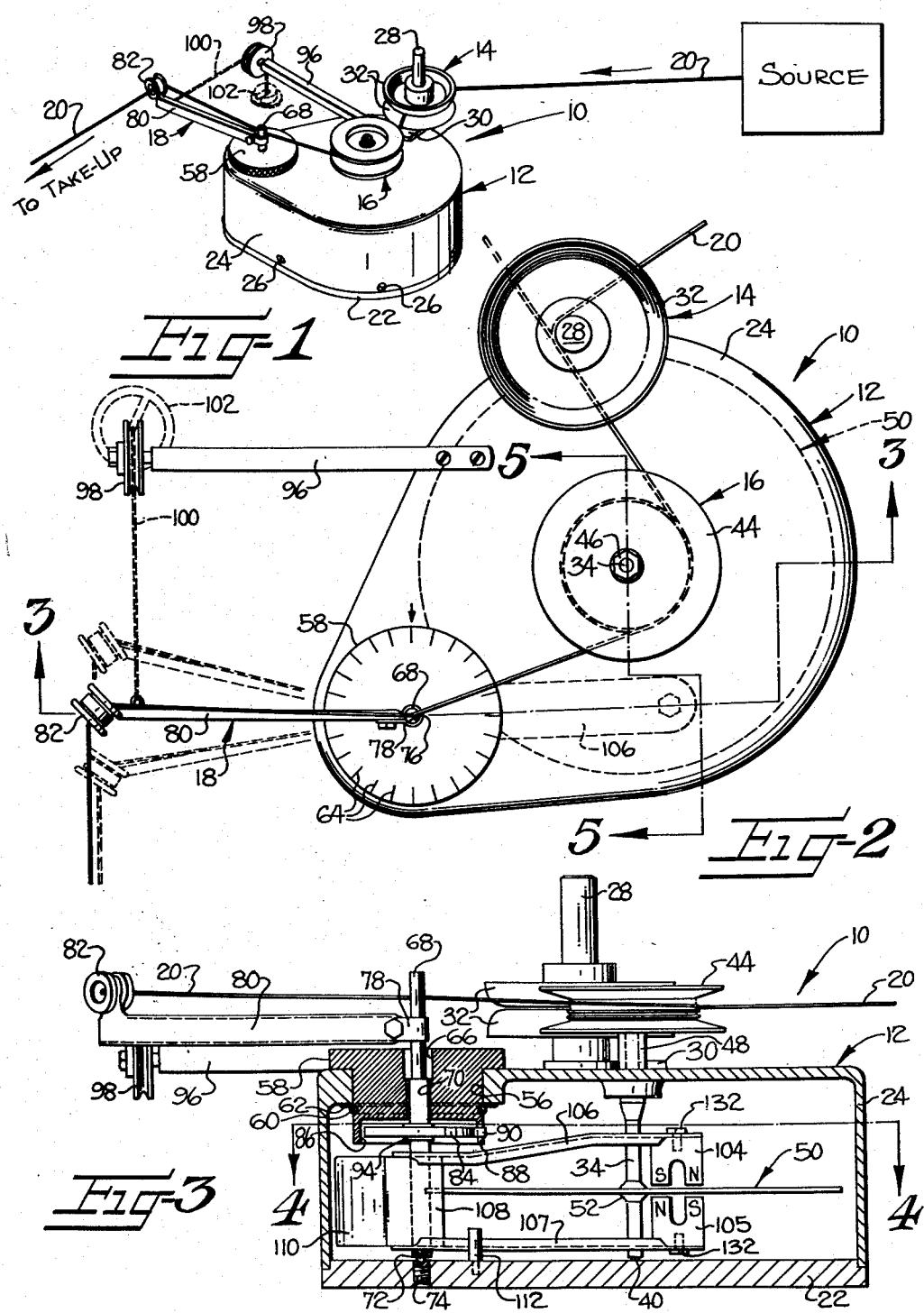

3,072,361
TENSION CONTROLLING DEVICE
Richard E. Fuller, Charlotte, N.C., assignor, by mesne assignments, to Ronson Corporation, Woodbridge, N.J., a corporation of New Jersey
Filed Sept. 5, 1961, Ser. No. 135,830
9 Claims. (Cl. 242—155)

This invention relates to an improved device for imparting tension to and automatically controlling the tension of running strands, particularly textile yarns, filaments and the like. More specifically, this invention relates to an improved tensioning device of the kind incorporating a magnetically braked whorl-type tensioner for applying a retarding force to a running strand passed about the pulley thereof.

Whorl-type tensioners that are magnetically braked, i.e., that utilize a magnet or magnets and the eddy current principle to impose a drag torque upon a nonmagnetic electrically conductive disc rotatable in unison with the pulley about which the running strand passes, are known. Those skilled in the art are also generally aware that in devices of this type, the drag torque upon the conductive disc, and therefore the retarding force imposed upon the running strand by the pulley rotatable with the disc, can be varied by varying the position of one or more of the magnets relative to the disc. United States Patent 2,688,789, issued September 14, 1954 to L. M. Duryee discloses in FIGURES 14 and 15 a device of this general type. The Duryee device includes a fixed magnet and a movable magnet which straddle the conductive flange of a pulley about which a running strand passes. These magnets produce a field which when cut by the rotating flange impose a drag torque thereon in a well known manner. This drag torque is varied in the Duryee device by shifting the movable magnet relative to the flange and the fixed magnet to thereby vary the intensity of the field cut by the flange. For example, to decrease the drag torque upon the flange of the Duryee device, the movable magnet is shifted away from the axis of rotation of he flange and out of registry with the fixed magnet. This decreases the intensity of the magnetic field cut by the flange, and—when the magnet has been moved to a sufficient extent—thereby decreases the drag torque thereupon.

A severe limitation inherent in the operation of the Duryee device is that considerable movement of the magnet is required before the drag torque on the flange is appreciably varied. This is attributable to opposing factors being at work in the Duryee construction whenever the drag torque upon the flange is varied. When the magnet is moved outwardly or away from the axis of rotation of the flange to decrease the drag torque thereon by decreasing the intensity of the field cut thereby, there is an increase in the moment component of the torque due to the increased lever arm and also an increase in the force component of the torque due to the greater linear speed of that portion of the flange closer to its periphery. Thus, in order to achieve the desired decrease in drag torque, the decrease in the intensity of the magnetic field must first offset the increases in the drag torque occasioned by increasing the moment and force components of the torque. Another quite significant limitation of the Duryee device is that it does not correct or compensate for variations in the tension of the strand passing therefrom to the take-up mechanism, which is generally regarded as the most critical area in which tension should be controlled, and in the Duryee device variations in the speed of the running strand cause the tension thereof in this area to vary markedly and without control. This constitutes a quite serious deficiency inasmuch as it is not at all unusual in some operations for the speed of a strand to vary considerably while it is being processed.

British Patent 589,529 of June 23, 1947 also discloses a tensioning device in which the drag torque upon a rotating conductive disc is varied by varying the position of magnets relative to the disc. The device of the British patent is also subject to the first mentioned limitation of the Duryee device, discussed above, in that an inordinate amount of movement of the magnets is required in order to appreciably vary the drag torque upon the rotating disc cutting their field, since the factors determining this torque oppose each other when it is varied. The degree of control that can be achieved, therefore, leaves a great deal to be desired. The problem of effective control is further complicated with the device of the British patent by reason of the fact that the conductive disc thereof is integral with the spool or bobbin containing the strand, and the inertia and momentum of such spool or bobbin must be overcome before effective control can be achieved.

With the foregoing in mind, a primary object of the instant invention is the provision of a tensioning device incorporating an improved whorl-type tensioner of the type employing movable magnets to achieve a variance in drag torque. In the device of the instant invention, effective tension control over a wide range is achieved even with a whorl-type tensioner of extremely small and compact construction, since the components thereof are so disposed and arranged that the various factors determining drag torque work in conjunction with—rather than in opposition to—each other.

Another object is the provision of a device of the type described which senses the tension of a strand passing therefrom to a take-up means, and which maintains the tension of the strand in this critical area at a desired, substantially constant value irrespective of changes in the linear speed of the strand and irrespective of changes of considerable magnitude in the tension of the strand entering the device.

Another object is the provision of a tensioning device having a high degree of sensitivity and which is capable of imposing and maintaining a desired tension in a running strand irrespective of whether the desired tension value is large or small.

A related object is the provision of a tensioning device capable of being adjusted quickly and with facility over a wide range to select the tension value that it is desired to impose and maintain in a running strand.

Still another object is the provision of a device of the type described that is of lightweight, compact and economical construction, and which requires minimum maintenance. In this connection, it is a more specific object to provide a device capable of prolonged trouble-free operation in a lint congested atmosphere such as frequently prevails in textile mills.

Still other objects and advantages will be in part evident and in part pointed out hereinafter in the following description of an illustrative embodiment of the invention, which should be read in conjunction with the accompanying drawings, in which—

FIGURE 1 is a perspective view of a device embodying the invention, and of a strand passing therethrough;

FIGURE 2 is an enlarged plan view of the device shown in FIGURE 1;

FIGURE 3 is a side elevation of the device shown in FIGURE 2 when viewed in the direction of the arrows 3—3, but with the housing and certain other components of the device being shown in a vertical section taken substantially along the line 3—3 of FIGURE 2.

FIGURE 4 is an enlarged fragmentary horizontal section taken substantially along line 4—4 in FIGURE 3, dotted lines being employed to illustrate the magnets and their supporting means in another position;

FIGURE 5 is a fragmentary vertical section taken substantially along line 5—5 in FIGURE 2; and FIGURE 6 is an enlarged fragmentary view of one of the magnets and its supporting arm of the device.

Referring more particularly to the drawings, the device identified in its entirety by the numeral 10 includes generally a housing 12 mounting a disc-type tensioning assembly 14, a whorl-type tensioning assembly 16, and tension sensing means 18. Under conditions of actual use, such as diagrammatically shown in FIGURE 1, device 10 is positioned in the path of travel of a running strand 20, which may be a textile yarn or filament. Enclosed within and shielded from foreign matter by housing 12 of the device is mechanism for compensatingly varying the retarding force imposed by whorl assembly 16 upon the strand passing therefrom in response to tension variations detected by sensing means 18, so that the tension of the strand passing from the device is maintained at a substantially constant desired value. The purpose of tensioning devices in general and their various applications are well known to those skilled in the art, and the device of the instant invention is intended for generally the same purposes and susceptible of the same applications as those tensioning devices heretofore known, but additionally realizes the various objects and advantages hereinbefore and subsequently noted by virtue of the structure to be now more specifically described.

Housing 12 of device 10 includes a base 22 having a cover 24 removably secured thereto by any suitable means, for instance as by screws 26 (see FIGURE 1). Tensioning assembly 14 is of the conventional disc type, and includes an upstanding shaft 28 (see FIGURE 3) mounted atop housing 12 by means of a bracket 30. A pair of freely rotatable plate members 32 are mounted upon shaft 28 and, as is known, are adapted to be rotated by and produce tension in a running strand snubbed about shaft 28 and passing therebetween.

Tensioning assembly 16 includes an upright spindle 34 (see FIGURE 5) extending through an aperture 36 provided in cover 24 of housing 12. The spindle is mounted for free rotative movement about its longitudinal axis relative to housing 12 by means of a sealed bearing 38 mounted within aperture 36 and by means of a hardened metallic ball 40 positioned between the lower end of spindle 34 and the concave face of an adjusting screw 42 threadably secured in base 22 of housing 12. A pulley 44 is rigidly secured to the upper end of spindle 34 between nut 46 and bushing 48 for rotation therewith. In the operation of device 10, running strand 20 passes about pulley 44 some two and one-quarter times, as shown in FIGURE 5, and rotates the pulley and spindle 34 in a clockwise direction (viewed from above). To minimize slippage and facilitate such rotation of the pulley and spindle with the strand passed about the former, pulley 44 should be formed of a material having a small mass and a high coefficient of friction with strand 20. Various suitable materials, such as hard anodized aluminum, possessing these desired properties are commercially available, and any one of these best suited to the strand being processed may be employed.

A disc member 50 disposed within housing 12 is also secured, as by means of hub 52, about spindle 34 for unitary rotative movement with the spindle and pulley 44. In the preferred embodiment shown in FIGURE 5, disc member 50 is constructed with a central nonconductive core 51 of laminated fiberglass or laminated paper, the major outer annular surface portion of which is coated with an electrically conductive non-magnetic material 53, such as copper or aluminum. This construction is preferred inasmuch as it enables disc member 50 to be of a lighter weight than if it were constructed entirely of material 53, and additionally since it provides an inner annular nonconductive portion adjacent hub 52, which is desirable for reasons hereinafter discussed. As will subsequently be apparent, however, disc member 50 could be constructed entirely of an electrically conductive nonmagnetic material, such as the material 53.

Referring now primarily to FIGURE 3, it will be seen that cover 24 of housing 12 is provided with another opening 56 which receives the reduced portion of a cap-like member 58. Snap ring 60 and washer 62 secure member 58 within opening 56 and prevent rotation of the former during ordinary operation of device 10, yet permit member 58 to be manually rotated about its central axis when desired for purposes to be hereinafter discussed. To facilitate such rotation of member 58, the vertical side edges of that portion thereof resting upon the upper surface of cover 24 are knurled (see FIGURES 1 and 5), and in order to indicate the rotative position of member 58 relative to cover 24 appropriate indicia 64, as shown in FIGURE 2, is provided thereon.

Referring once again to FIGURE 3, member 58 is provided with a central bore 66 through which extends a rocker shaft 68 mounted by means of a bushing or bearing 70 disposed within bore 66 of member 58 and by a ball 72 supported upon an adjusting screw 74 extending through base 22 of housing 12. The upper end portion of shaft 68 extends above housing 12 and member 58, and is slotted, the slot being identified by the numeral 76 in FIGURES 2 and 5, to provide a smooth guide way for the strand 20 passing from pulley 44. Secured to shaft 68 beneath slot 76, as by means of a clamp 78, is an elongate arm 80. The arm extends substantially normal to shaft 68 and carries at its outer end a second strand guiding member, illustratively a smooth eyelet 82, the axis of which defines approximately a 45 degree angle with the longitudinal axis of arm 80 and through which strand 20 also passes.

Arm 80 and rocket shaft 68 are biased for movement in a clockwise direction, alternative means being shown in the illustrative embodiment of the drawings for this purpose. The preferred means, best seen in FIGURES 3 and 4, comprises a low rate spiral spring 84 disposed about shaft 68 within a recess defined by a downwardly extending flange 86 upon the lower end of member 58. Flange 86 is provided with a notch 88 to which one end 90 of spring 84 is secured. The other end 92 of spring 84 is carried by a collar 94 fixedly but removably secured by any suitable means to shaft 68, which is thus biased for rotation in a clockwise direction.

In FIGURES 1 and 2, the alternative means for biasing arm 80 is shown, and includes an arm 96 secured at one end to cover 24 of housing 12 and carrying at its opposite end a pulley 98. As shown in phantom lines, a cord 100 carrying a weight and weight carrier 102 is secured to arm 80 and passed about pulley 98, thus urging arm 80 toward arm 96 or in a clockwise direction.

Referring now particularly to FIGURES 3 through 6, the whorl-type tensioning assembly generally designated by the numeral 16 in FIGURE 1 also includes a pair of opposed magnets 104, 105 straddling disc 50 and carried by elongate arms 106, 107, respectively, which are secured at their inner ends to a collar 108 rigidly mounted upon rocker shaft 68 for movement therewith. A counterweight 110 is provided on that side of collar 108 opposite arms 106, 107 so that the weight of the arms and the magnets carried thereby does not impede the free rocker motion of shaft 68, and so as to permit operation of device 10 irrespective of the attitude in which it might be situated. At least one of the magnets 104, 105, illustratively magnet 104, is secured to its supporting arm in such a manner that its rotative position about its longitudinal axis, and therefore the position of its poles relative to the other magnet of the pair, is capable of adjustment. As shown in FIGURE 6, the capability for this adjustment is obtained by a screw 132 extending through the outer end portion of arm 106 and received within a threaded bore provided in the upper end of magnet 104. As is obvious, positional adjustment of magnet 104 may be achieved merely by retaining the magnet in the desired position while tightening screw 132. Magnet 105 may be secured to its supporting arm 107 in a similar manner, as shown, or may be permanently affixed thereto as by means of a rivet.

Magnets 104, 105 are shown in the drawings with their opposite poles directly opposed, such that a magnetic field of maximum intensity extends therebetween. Once the rotative position of the magnets relative to each other has been fixed in this or another desired position, which fixation would occur when device 10 is initially fabricated, the magnets will remain stationary relative to each other but be movable as a unit relative to the disc 50 which they straddle under the impetus of rocker motion of shaft 68. Stop pins 112, 114 extending upwardly from base 22 of housing 12 into the path of travel of arm 107 limit and define the extreme displacements of which arms 106, 107, arm 80, and magnets 104, 105 are capable. The extreme positions of arm 80 defined by stop pins 112, 114 are shown in phantom lines in FIGURE 2, and the corresponding extreme positions of magnets 104, 105 are shown by solid and phantom lines in FIGURE 4. It will be noted from FIGURE 4 that magnets 104, 105 are movable generally radially of disc member 50 between a position immediately inwardly of its peripheral edge and a position adjacent hub 52.

When magnets 104, 105 straddle any part of that portion of disc 50 coated with conductive material 53, it will be apparent that the magnetic field extending between the magnets will be cut by material 53 of disc 50 as the latter rotates in unison with pulley 44 and spindle 34, producing a drag torque upon the disc impeding rotation of these members. The magnitude of the drag torque thus produced is dependent upon the velocity of that coated portion of disc 50 cutting the field of magnets 104, 105, and upon the distance of this field from the axis of rotation of disc 50. Thus, in the solid line position of the magnets shown in FIGURES 4 and 5, a maximum drag torque is imposed upon disc 50 since the magnets are disposed a maximum distance from the axis of rotation thereof and since that portion of disc 50 traveling at a maximum velocity is cutting the magnetic field. In the operating position of the device shown in FIGURE 2, a lesser drag torque is imposed upon disc 50 and its associated spindle 34 and pulley 44 inasmuch as both the moment and force components of the torque are lesser, the magnetic field being disposed closer to the axis of rotation of disc 50 and that portion of the disc cutting the field traveling at a lesser velocity. It will be noted that in the instant device the various factors determining drag torque act in conjunction with, rather than in opposition to, each other when the position of the magnets is varied relative to disc 50. When magnets 104, 105 straddle the uncoated, inner annular portion of disc 50, as shown in phantom lines in FIGURES 4 and 5, no magnetic drag torque is produced upon the disc inasmuch as core 51 thereof is nonconductive, as previously noted. At such times, therefore, disc 50, spindle 34 and pulley 44 rotate freely with only the minimal restraint caused by bearing friction.

In operation, device 10 is disposed at any convenient location intermediate the source and take-up of the strand 20 in which tension is to be produced and controlled. As noted previously herein, the device need not be situated level upon its base 22, but can be disposed in any convenient attitude, which is a significant advantage. The strand is threaded through the device as shown by solid lines in FIGURES 1 and 2 excepting, however, that if the tension which it is desired that device 10 impose upon the strand is sufficiently low, then disc assembly 14 may be by-passed and the strand led directly to pulley 44 from its source, as shown in phantom lines in FIGURE 2.

When at the outset the device is in a static condition by reason of strand 20 being stationary, arm 80 will be in its uppermost phantom line position depicted in FIGURE 2 and magnets 104, 105 will be in the position shown by solid lines in FIGURES 4 and 5. These components are so disposed due to the clockwise bias upon rocker shaft 68, it being assumed at present that the preferred spring biasing means is employed to produce this clockwise torque. Now, as soon as the take-up mechanism is actuated and strand 20 commences running, a drag torque of maximum value—for that particular linear speed of the strand—will be imposed upon disc 50 and pulley 44. Pulley 44 will, in turn, impose a retarding force upon the strand and thereby produce tension in the strand leaving the device. The tensioned strand 20 pasisng through eyelet 82 exerts a force thereon producing a counterclockwise torque on shaft 68. This torque tends to pivot shaft 68 and arm 80 in a counterclockwise direction, and thus to move magnets 104, 105 inwardly of disc 50 or toward spindle 34. Inward movement of the magnets reduces the drag torque upon disc 50, and therefore reduces the retarding force imposed upon the strand by pulley 44, which in turn reduces the tension of the strand passing through eyelet 82. Absent any clockwise biasing means acting upon shaft 68, magnets 104, 105, would be moved to their innermost position (shown in phantom lines in FIGURES 4 and 5). Moreover, since bearing friction and running friction of strand 20 with guide 76 and eyelet 82 would produce a minimum tension in the strand passing from eyelet 82, absent any biasing means, arm 80 would be maintained in its extreme counterclockwise position shown by phantom lines in FIGURE 2. Since biasing means are provided in the instant device, however, this undesirable result does not occur. Rather, the counterclockwise torque imposed upon shaft 68 by the strand tension force acting upon eyelet 82 is opposed by the clockwise torque upon the shaft that is produced by spring 84. Since spring 84, as previously noted herein, has a low rate, the force exerted thereby and the clockwise torque upon shaft 68 which this force produces are substantially constant within the range of movement of arm 80, which range extends through an arc of only some 22½ degrees. But as arm 80 moves through this range, the opposing torque, i.e., the counterclockwise torque upon shaft 68 does vary, decreasing—as arm 80 moves from its upper toward its lower phantom line position shown in FIGURE 2—due to a reduction of the tension in the strand passing through eyelet 82 by reason of pulley 44 exerting a lesser retarding force upon the strand as magnets 104, 105 move toward spindle 34 of disc 50. Therefore, referring again to FIGURE 2, at some point in the course of arm 80's counterclockwise movement from its uppermost phantom line position, arm 80 reaches a position—illustratively that shown in solid lines—at which the clockwise and counterclockwise torques upon shaft 68 are balanced and in equilibrium. When the components of device 10 are in such an equilibrium position, the strand 20 passing therefrom will be under some definite tension which, for simplicity of description, will at present be assumed to be of the desired value.

The tension of the strand leaving device 10 will be automatically maintained at this desired constant value irrepsective of changes in the tension of the strand entering the device and irrespective of changes in the linear speed of the strand. If the tension of the strand entering the device should suddenly increase, as might be caused by some bearing failure associated with the bobbin or other source from which the strand passes, the increased tension in the strand passing through eyelet 82 causes an increase in the counterclockwise torque upon shaft 68 which moves arm 80 from its solid line equilibrium position toward its phantom line extreme counterclockwise position. This movement of arm 80 is simultaneously transmitted through the linkage defined by rocker shaft 68 and arms 106, 107 to magnets 104, 105, moving the latter inwardly toward spindle 34 to reduce the drag torque on disc 50 and thereby reduce the retarding force imposed upon the strand leaving the device by pulley 44. Arm 80 and magnets 104, 105 are displaced from their previous equilibrium positions only to such extent as is necessary for the decrease in strand tension caused by reduction of the retarding force imposed upon the strand by pulley 44 to offset and compensate for the increase in the tension of the strand entering device 10. At such time as this compensation is made, and it will be realized that it transpires practically instantaneously, arm 80 and magnets 104, 105 will remain static in a new equilibrium position until such time as there is another change in operating conditions.

The distance between the old and new equilibrium positions of arm 80 and magnets 104, 105 will depend, of course, upon the magnitude of the tension variation for which compensation was made. This distance is usually rather small since the instant device achieves a considerable variation in drag torque with relatively minor movement of the magnets, as previously noted herein, and compensation can be made for tension variations over a wide range by movement of the magnets over that portion of disc 50 coated with non-magnetic conductive material 53.

If, however, there should be an unusually severe increase in strand tension, for which compensation could not be made by movement of the magnets within this range, it will be apparent that the magnets would be moved to their innermost extreme position adjacent spindle 34, where they will straddle the uncoated nonconductive portion of disc 50 (see FIGURE 4, phantom line showing). Since in this position of the magnets no drag torque whatsoever is imposed upon disc 50, the retarding force imposed upon strand 20 by pulley 44 is immediately completely eliminated insofar as is possible. It will be appreciated that this result, and the structure from which it accrues, are highly desirable. Thus, while a disc 50 composed entirely of a non-magnetic conductive material could be employepd in the instant device, the foregoing benefit would not be realized with such construction.

Undesired decreases in the tension of the strand passing from eyelet 82 are sensed and eliminated in precisely the same manner as described above with respect to tension increases with, however, arm 80 moving in a clockwise direction and magnets 104, 105 moving outwardly toward the peripheral edge of disc 50. An unusually severe decrease in tension, as might be occasioned by an abrupt shutdown of the strand take-up mrechanism, causes instant movement of the magnets to their outermost extreme position illustrated in solid lines in FIGURE 4, in which position a maximum drag torque is immediately placed upon disc 50 and pulley 44 so as to simultaneously impose a maximum retarding force upon the strand and thereby prevent its "backlash." In this connection, the importance of stop pin 112 is noteworthy. Pin 112 is so situated as to prevent magnets 104, 105 from moving beyond the peripheral edge of disc 50, inasmuch as such movement would have the undesirable effect of reducing—rather than producing a maximum—drag torque on the disc.

The manner in which the instant device compensates for tension variations indirectly attributable to changes in the linear speed of strand 20 is the same as that described above. For instance, assume the components of device 10 are in an equilibrium condition with arm 80 situated in its solid line position shown in FIGURE 2 and with strand 20 running at a constant speed. An increase in strand speed, as might be caused by an increase in the diameter of a take-up bobbin, would produce a momentary increase in the tension of the strand passing from device 10. This increase in tension would be caused by the increased drag torque on disc 50 resulting from faster cutting of the magnetic field between magnets 104, 105, and by the increased friction between strand 20 and all eyelets, guides and bearings between the strand source and take-up with which the strand comes into contact or is associated. This momentary increase in strand tension is, however, instantaneously detected and compensated for in the same manner as increases in tension due to factors other than strand speed. Similarly, decreases in strand tension due to decreases in the linear speed of the strand are immediately sensed and corrected by the instant device.

In the foregoing description, it was assumed for purposes of simplicity that when the components of the device initially reached an equilibrium condition the tension in the strand passing from eyelet 82 was of the desired value. Obviously, however, in actual practice it would be highly desirable to be able to select a desired tension value which one might wish to impose upon and maintain in the strand 20 leaving the device. With the instant device, such selection is not only possible, but moreover can be achieved with facility.

Thus, assume that when the components of the device 10 are in the solid line equilibrium condition shown in FIGURE 2, the tension of strand 20 passing from eyelet 82 is lower than the desired value. The value of this strand tension is, it will be recalled, indirectly related to the clockwise biasing torque upon shaft 68. This torque, in turn, is a function of the force exerted upon shaft 68 by spring 84, it being assumed at present that the preferred spring biasing means is employed. The tension of the strand passing from eyelet 82 can be varied, therefore, by adjusting the force of spring 84. In the instant device, this adjustment can be accomplished quickly and easily merely by manualy rotating member 58 in the appropriate direction to thereby further coil or uncoil spring 84 and thus increase or decrease, respectively, the force exerted thereby. Thus, in the instant example in which it was asumed that the strand tension is of a lower value than desired, member 58 is rotated in a clockwise direction (see FIGURE 4) to thereby further coil spring 84. Since spring 84 possesses, as noted heretofore, a low rate, several full rotations of member 58 may be required before the further coiling of the spring produces an appreciable increase in the effective force exerted thereby upon shaft 68. At such time as a significant increase in the effective force of spring 84 is achieved by rotation of member 58, however, the previously existing equilibrium condition between the clockwise and counterclockwise torques upon shaft 68 is upset. Since the clockwise torque is then greater than the counterclockwise torque, shaft 68 and its associated components rock in a clockwise direction. Under the impetus of this movement of shaft 68, magnets 104, 105 are moved outwardly, or toward the periphery of disc 50. This movement of the magnets produces an increase in the drag torque upon disc 50, which in turn causes an increase in the retarding force imposed upon strand 20 by pulley 44 and thereby causes an increase in the tension of the strand passing from eyelet 82. The last-noted effect, of course, causes an increase in the counterclockwise torque upon shaft 68, which increase will be just sufficient to balance the increase in clockwise torque upon the shaft occasioned by rotation of member 58 as described previously. Upon rotation of member 58, therefore, shaft 68 and its associated components are shifted from their previous equilibrium positions only to such an extent as is necessary for the clockwise and counterclockwise torques to again be in balance. When such balance is realized, the components of device 10 will be disposed in a new equilibrium position, slightly removed from the equilibrium position shown in FIGURE 2, and the tension of the strand 20 passing from the device will be at a new, increased value. This new tension value will then be maintained in the strand leaving device 10, despite possible variances in the tension of the strand entering the device and despite possible changes in the linear speed of the strand, in the manner heretofore described.

From the foregoing description, it will be apparent that when the preferred spring biasing means is employed the device's capability to produce and maintain a desired tension in strand 20 is limited only by the maximum adjustment of which spring 84 is susceptible. In this connection, it has been found that the clockwise torque upon shaft 68 necessary to counterbalance a counterclockwise torque produced by any force upon eyelet 82 ranging in value from three to twenty-five grams can be realized by rotation of member 58 from a single suitable spring 84. When in a particular usage of the device a force greater than twenty-five grams is exerted upon eyelet 82, a greater counterbalancing torque is necessary and can be achieved by the substitution in device 10 of a stronger spring 84, which substitution can be accomplished without difficulty. Thus, the clockwise torque upon shaft 68 necessary to counterbalance the counterclockwise torque produced by any force upon eyelet 82 ranging between twenty and seventy-five grams can be realized by the substitution of a second, stronger spring 84 in lieu of the spring described above. By the substitution of a third, still stronger spring, any force upon eyelet 82 between the range of seventy to one hundred and fifty grams can be counterbalanced, the exact desired counterbalancing clockwise torque within this range being, of course, selected by rotation of member 58 as described previously.

By suitable calibration, indicia 64 upon member 58 may be utilized to indicate, for the various rotative and adjustive positions of member 58, the value of the clockwise torque exerted by spring 84, or the value of the force upon eyelet 82 which it counterbalances. It is also perhaps noteworthy that adjustment of device 10 by rotation of member 58 can be accomplished either while strand 20 is in a static or a dynamic condition.

Referring now to FIGURES 1 and 2, when the weight biasing means including arm 96, pulley 98, cord 100 and weight carrier 102 is employed, spring 84 may be omitted or disconnected from device 10. The exact counterbalancing torque desired is then realized merely by adjusting the value of the weight upon the weight carrier 102 supported by cord 100. While this weight biasing system has been found effective when the force upon eyelet 82 is relatively large, the spring biasing means previously described is particularly preferred when the force upon eyelet 82 is of a low value or magnitude.

Irrespective of whether the spring or weight system is employed, it should be apparent from the foregoing description that the biasing means and its associated arm 80 and eyelet 82 are not intended to impose tension upon strand 20. Rather, these components merely define means for sensing variations in the tension of the strand. A sensed variation in tension is reflected by movement of shaft 68 which, in turn, causes a compensating variation in the retarding force imposed upon strand 20 by pulley 44.

The provision of guide slot 76 in shaft 68 and the entraining of strand 20 therethrough are deemed significantly beneficial factors in that they eliminate a variable which would otherwise be inherent in the operation of the device. Thus, it will be noted that if guide 76 were not provided and strand 20 were passed directly from pulley 44 to eyelet 82, an increase in strand tension would produce not only a first torque tending to pivot arm 80 in a counterclockwise direction, but would also produce a second torque tending to rotate the arm in a clockwise direction. By entraining strand 20 through slot 76, this undesirable second torque is eliminated by reducing its lever arm to zero.

It is apparent that the instant invention provides a compact and economical device characterized by extreme sensitivity and readily capable of adjustment over a wide range of operating conditions. In addition to the various objects and advantages hereinbefore set forth, such as the capability to produce and maintain a desired tension in a strand passing to a take-up mechanism irrespective of changes in the tension of the strand at its source and irrespective of changes in the linear speed of the strand, the device described and illustrated herein realizes many practical bnefits, such as its capability for operation in a lint congested atmosphere with a minimum of maintenance by reason of its closed construction.

In the drawings and specification there has been set forth a preferred embodiment of the invention and, although specific terms are employed, they are used in a generic and descriptive sense only and not for purposes of limitation, the scope of the invention being defined in the claims.

That which is claimed is:

1. A device for producing and maintaining desired tension in a running strand of material comprising a pulley member, a disc member having at least a portion formed of an electrically conductive non-magnetic material, means mounting said pulley and disc members for unitary rotative movement, said strand being adapted to pass about said pulley member and thereby rotate said pulley and disc members, a pair of magnets positioned on opposite sides of said disc member in opposed spaced relation to each other and to said disc member, said magnets generating a magnetic field therebetween of constant force during operation of the device for exerting a drag upon said disc member opposing rotation thereof, means mounting said magnets for unitary movement relative to said disc member to vary the distance thereof from the axis of rotation of said disc member and thereby vary the drag torque thereupon, sensing means engaging the strand passing from said pulley member for detecting variations in the tension thereof, and means interconnecting said magnet mounting means and said sensing means for moving said magnets toward the axis of rotation of said disc member upon a detected increase in the tension of said strand by said sensing means and away from the axis of rotation of said disc member upon a detected decrease in the tension of said strand by said sensing means.

2. A device as in claim 1, wherein said sensing means includes a rocker shaft, an elongate arm member secured to and extending outwardly from said shaft, strand guide means carried by said arm member, the strand leaving said pulley member being adapted to travel generally longitudinally of said arm member through said guide means and to pass angularly therefrom, thereby producing a torque tending to pivot said arm member and said shaft in a first rotative direction, and biasing means operatively connected to said arm member and said shaft for exerting a counterbalancing torque thereon to resiliently maintain said arm member and said shaft stationary while the tension of said strand passing through said guide means is constant.

3. A device as in claim 2, wherein said biasing means comprises a weight connected to said arm member and adapted to produce a counterbalancing torque upon said arm member and said shaft equal in magnitude and opposite in direction to the torque exerted thereon by said strand while running under the desired tension.

4. A device as in claim 2, wherein said biasing means comprises a low rate spiral spring connected to said shaft and adapted to produce a counterbalancing torque upon said arm member and said shaft equal in magnitude and opposite in direction to the torque exerted thereon by said strand while running under the desired tension.

5. A device as in claim 4, and further including adjusting means connected to said spring for varying the force exerted thereby when desired, whereby the counterbalancing torque exerted by said biasing means can be adjusted to counterbalance the torque produced by a range of strand tensions.

6. A device for producing and maintaining desired tension in a running strand of material comprising a rotatably mounted pulley around which the strand is adapted to be passed for imparting rotation to said pulley, a disc member having at least a portion formed of electrically conductive non-magnetic material and being connected to said pulley and driven in unison therewith by the strand, a pair of opposing magnets straddling said disc and generating therebetween a magnetic field of constant force during operation of the device, arm means connected to said magnets and being mounted for pivotal movement for permitting unitary movement of said magnets toward and away from the axis of rotation of said disc, means limiting the pivotal movement of said arm means to maintain said magnets inwardly of the peripheral edge of said disc to thereby maintain said disc within the magnetic field of said magnets, pivotally movable sensing means for detecting variations in the tension of the strand passing from said pulley, and means interconnecting said arm means and said sensing means for moving said magnets toward the axis of rotation of said disc member upon a detected increase in the tension of said strand by said sensing means and away from the axis of rotation of said disc member upon a detected decrease in the tension of said strand by said sensing means.

7. A device as in claim 6, wherein at least one of said magnets is adjustably connected to said arm means whereby the relative position of the poles of said magnets can be varied when desired to vary the intensity of the magnetic field therebetween.

8. A device as in claim 6, wherein said disc has an inner annular portion formed of non-conductive non-magnetic material, whereby no drag torque is exerted upon said disc when said magnets straddle said non-conductive portion.

9. A device for producing and maintaining desired tension in a running strand of material comprising a pulley member, a disc member having an inner annular portion formed of a non-conductive no-magnetic material and a remaining portion formed at least partially of an electrically conductive non-magnetic material, means mounting said pulley and disc members in mutually spaced relation for unitary rotative movement about a common axis, said strand being adapted to pass about said pulley member and thereby rotate said pulley and disc members, a pair of magnets positioned on opposite sides of said disc member in opposed spaced relation to each other and to said disc member, said magnets generating a magnetic field therebetween of constant force during operation of the device and exerting a drag upon said disc member opposing rotation thereof when opposite said conductive portion of said disc, means mounting said magnets for unitary movement relative to said disc member to vary the distance thereof from the axis of rotation of said disc member and thereby vary the drag torque thereupon, sensing means engaging the strand passing from said pulley member for detecting variations in the tension thereof, and means interconnecting said magnet mounting means and said sensing means for moving said magnets toward the axis of rotation of said disc member upon a detected increase in the tension of said strand by said sensing means and away from the axis of rotation of said disc member upon a detected decrease in the tension of said strand by said sensing means.

References Cited in the file of this patent

UNITED STATES PATENTS

| | | |
|---|---|---|
| 2,571,678 | Burns | Oct. 16, 1951 |
| 2,642,236 | Heizer | June 16, 1953 |
| 2,688,789 | Duryee | Sept. 14, 1954 |
| 2,823,874 | Noe | Feb. 18, 1958 |

FOREIGN PATENTS

| | | |
|---|---|---|
| 808,430 | France | Nov. 14, 1936 |
| 589,529 | Great Britain | June 23, 1947 |